United States Patent [19]

Naoki et al.

[11] Patent Number: 5,124,975
[45] Date of Patent: Jun. 23, 1992

[54] DEVICE FOR OPENING AND CLOSING A SHUTTER OF A DISK CARTRIDGE

[75] Inventors: Goro Naoki; Ichiro Kawamura, both of Osaka, Japan

[73] Assignee: Matsushita Electric Industrial Co., Ltd., Osaka, Japan

[21] Appl. No.: 669,185

[22] Filed: Mar. 13, 1991

[30] Foreign Application Priority Data

Mar. 15, 1990 [JP] Japan .................................. 2-65763

[51] Int. Cl.⁵ ........................ G11B 3/70; G11B 33/02; G11B 5/016; G11B 17/04
[52] U.S. Cl. .................................. 369/291; 369/75.1; 369/77.2; 360/99.06
[58] Field of Search ...................... 369/291, 75.1, 75.2, 369/77.1, 77.2; 360/99.02, 99.06, 96.5, 96.6, 97.01, 97.04, 133, 99.03, 99.07

[56] References Cited

U.S. PATENT DOCUMENTS

| | | | |
|---|---|---|---|
| 4,811,137 | 3/1989 | Muto et al. | 369/77.2 |
| 4,833,553 | 5/1989 | Noda et al. | 360/99.06 |
| 4,964,005 | 10/1990 | Uzuki | 369/77.2 X |

FOREIGN PATENT DOCUMENTS 0102361  6/1983  Japan ................................. 360/99.06

Primary Examiner—Stuart S. Levy
Assistant Examiner—Tien Ba Pham
Attorney, Agent, or Firm—Pollock, VandeSande & Priddy

[57] ABSTRACT

A shutter opening and device includes movable components such as a lever, an actuating pin and a spring all disposed in a guide channel of a cartridge holder into which a disk cartridge is inserted. The device of this construction is low in profile and compact in size and makes it possible to reduce the overall size of a disk drive in which the device is incorporated. With the combination of a straight guide groove and an oblique guide groove formed in the cartridge holder, the actuating pin is movable along a substantially straight path. This enables the user to insert the disk cartridge into the cartridge holder smoothly with a small muscular effort.

3 Claims, 6 Drawing Sheets

DEVICE FOR OPENING AND CLOSING A SHUTTER OF A DISK CARTRIDGE

BACKGROUND OF THE INVENTION

1. Field of the Invention

The present invention relates generally to a disk drive for use with disk cartridges containing a recording disk, and more particularly to a device for opening and closing a shutter of the disk cartridge when the disk cartridge is loaded and unloaded relative to the disk drive.

2. Description of the Prior Art

In recent years, a system for recording and reading information on a recording disk such as a floppy disk or an optical disk has been extensively used. However, with a wide variety of uses in view, the demand for a compact disk drive has increased.

FIGS. 6(a) and 6(b) of the accompanying drawings show one example of generally used disk cartridges. The disk cartridge is a protective container disk cartridge 20 that contains a recording disk 21. The disk cartridge 20 has a shutter 22 for protecting the recording disk 21 against damage which would otherwise be caused mainly by dust. The shutter 22 is slidable in the directions indicated by the arrowheads X1 and X2 and urged by a spring (not shown) in the direction of the arrow X1 so that it is normally held in the closed position shown in FIG. 6(a). When information is to be recorded on, or read from, the recording disk 21, the shutter 22 is caused to slide in the direction of the arrow X2 until it assumes the open position of FIG. 6(b). In this open position, a head window 23 in the cartridge 20 and a window 24 in the shutter 22 are superposed, so that a portion of the recording disk 21 is exposed. Now, information can be recorded on, or read from, the recording disk 21.

FIG. 7 schematically shows a conventional device for opening and closing the shutter of the disk cartridge. The shutter opening and closing device includes a cartridge holder 25 for guiding the disk cartridge 20 (FIGS. 6(a) and 6(b)) as it is loaded on, or unloaded from, a disk drive (not shown). A lever 26 is pivotally movable about a pin 27 secured to the cartridge holder 25. An actuating pin 28 projecting from the free end of the lever 26 is engageable with the disk cartridge 20 and the shutter 22. The cartridge holder 25 has an arcuate guide groove 29 for guiding therealong the actuating pin 28. A tension coil spring 30 is connected at its one end to a first lug 31 on the cartridge holder 25 and, at the opposite end, to a second lug 32 on the lever 26 and urges the lever 26 to turn about the pin 27 in the direction of the arrow R2.

The conventional shutter opening and closing device of the foregoing construction operates as follows.

When the disk cartridge 20 is inserted into the cartridge holder 25 in the direction of the arrow Y1 of FIG. 8, the actuating pin 28 engages a front guide wall 33 of the disk cartridge 20 and a front corner 34 of the shutter 22, as shown in FIG. 8.

As the forward movement of the disk cartridge 20 continues, the front guide wall 33 of the disk cartridge 20 causes the actuating pin 28 to move arcuately along the guide groove 29 in the direction of the arrow R1, as shown in FIG. 9, thereby turning the lever 26 about the pin 27 in the same direction against the force of the spring 30 (FIG. 7). During that time, since the actuating pin 28 is held in engagement with the front corner 34 of the shutter 22 under the force of the spring 30 (FIG. 7), the arcuate movement of the actuating pin 28 causes the shutter 22 to slide transversely in the direction of the arrow X2 against the force of the spring (not shown) disposed in the disk cartridge 20.

When the disk cartridge 20 is fully inserted into the cartridge holder 25, as shown in FIG. 10, the actuating pin 28 displaces the shutter 22 to its leftmost open position in which, as shown in FIG. 6(b), a portion of the recording disk 21 is exposed through the head window 23 of the disk cartridge 20 and the window 24 of the shutter 22.

In the course of the foregoing loading operation, if the forward movement of the disk cartridge 20 is discontinued by releasing the forward pushing force or pressure on the disk cartridge 20, the shutter 22 tends to move in the direction of the arrow X1 under the force of the non-illustrated spring. At the same time, the actuating pin 28 moves arcuately along the guide groove 29 in the direction of the arrow R2 under the force of the spring 30, thereby forcing the front guide wall 33 of the disk cartridge 20 rearward in the direction of the arrow Y2. Thus, the disk cartridge 20 is removed from the cartridge holder 1. This arcuate movement of the actuating pin 28 allows the shutter 22 to move in the direction of the arrow X1 toward its closed position of FIG. 6(a) in which the shutter 22 closes the head window 23 of the disk cartridge 20 to protect the recording disk 21 against the damage.

However, since the lever 26, the pin 27, and the tension coil spring 30 are all disposed on the outside of the cartridge holder 25, the conventional shutter opening and closing device is relatively large in thickness and hence occupies a relatively large space for installation thereof. The conventional shutter opening and closing device of this construction is, therefore, unable to meet the demand for a compact disk drive unit.

SUMMARY OF THE INVENTION

With the foregoing difficulties of the prior art in view, it is an object of the present invention to provide a device for opening and closing a shutter of a disk cartridge, which is low in profile and compact in size and hence is capable of minimizing the overall size of a disk drive in which the shutter opening and closing device is incorporated.

Another object of the present invention is to provide a shutter opening and closing device incorporating structural features which enable an easy insertion and removal of a disk cartridge relative to the cartridge holder only with a small muscular effort.

In brief, movable components of a shutter opening and closing device, such as a lever, an actuating pin and a spring are all disposed in a guide channel of a cartridge holder into which a disk cartridge is inserted. The device thus constructed is low in profile and compact in size and, hence, makes it possible to reduce the overall size of a disk drive in which the device is incorporated. The cartridge holder has a straight guide groove and an oblique guide groove that enables the actuating pin to move along a substantially straight path. With this linear movement of the actuating pin, the disk cartridge can be smoothly inserted into the cartridge holder with a small muscular effort.

More specifically, a shutter opening and closing device of this invention comprises a cartridge holder defining a guide channel receptive of a disk cartridge, the cartridge holder having a first guide groove extending in a first direction substantially parallel to the direction of insertion and removal of the disk cartridge relative to the guide channel of the cartridge holder, and a second guide groove extending obliquely to the first direction and inclined toward a second direction to which the shutter is opened; a lever disposed in the guide channel of the cartridge holder and having first and second guide pins fitted in, and slidable along, the first and second guide grooves, respectively; an actuating pin disposed on the lever and engageable with the shutter to open and close the shutter; and a spring disposed in the guide channel for urging the lever in a direction to close the shutter.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
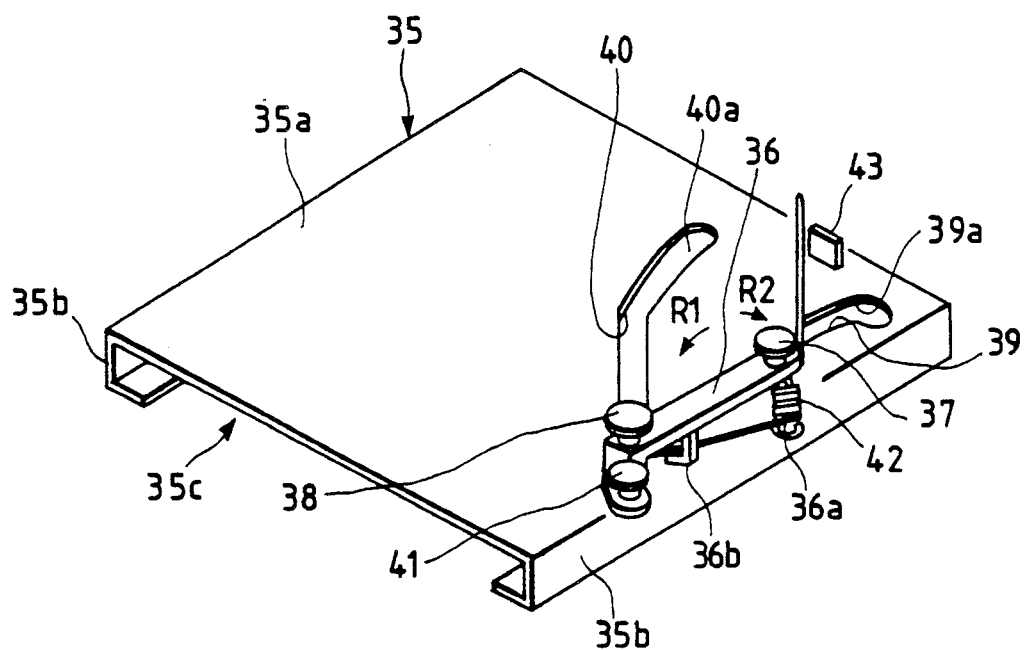
FIG. 1 is a schematic perspective view of a device for opening and closing a shutter of a disk cartridge according to the present invention.

FIG. 1 perspectively shows a device for opening and closing a shutter of a disk cartridge according to the present invention.

Figure 6A:
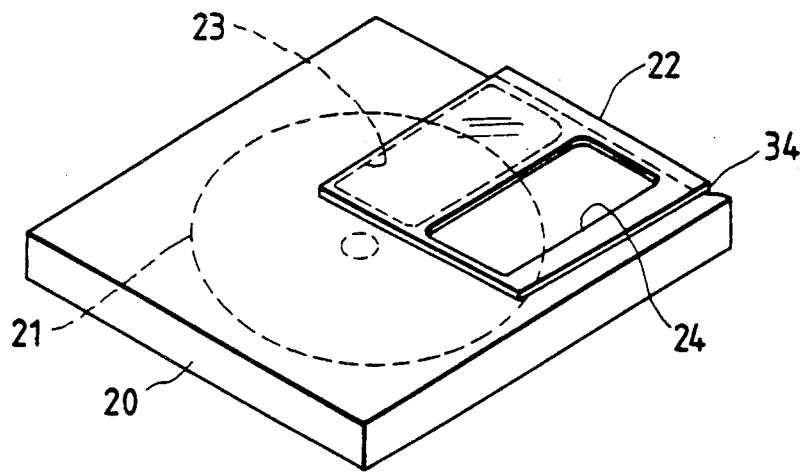
FIG. 6(a) is a schematic perspective view of a conventional disk cartridge with a shutter in the closed position.

The shutter opening and closing device includes a flat cartridge holder 35 having an upper wall 35a and opposed side walls 35b, 35b bent inwardly toward each other. The upper wall 35a and the side walls 35b jointly define therebetween a guide channel 35c for receiving therein a disk cartridge 20 (FIG. 6(a)) when the disk cartridge is loaded on and unloaded from a disk drive (not shown) in which the shutter opening and closing device is incorporated. A lever 36 is disposed in the guide channel 35c adjacent to one side wall 35b (right side wall in the illustrated embodiment) of the cartridge holder 35. The lever 36 is in the shape of a dogleg and has a stepped front end. A first pin 37 is mounted on a rear end of the lever 36. A second pin 38 is mounted on the lever 36 immediately ahead of the stepped front end thereof. The first and second pins 37, 38 are slidably received in first and second guide grooves 39, 40, respectively, formed in the upper wall 35a of the cartridge holder 35. Each of the first and second pins 37, 38 has a flat enlarged head disposed on the outside surface of the upper wall 35a so that the lever 36 is movably suspended from the upper wall 35a of the cartridge holder 35 by means of the headed pins 37, 38.

The first guide groove 39 extends in a direction substantially parallel to the direction of insertion and removal of the disk cartridge 20 relative to the guide channel 35c of the cartridge holder 35. The second guide groove 40 extends obliquely to the first guide groove 39 and is inclined toward a direction to which the shutter 22 of the disk cartridge 20 is opened. The first guide groove 39 has an end extension 39a contiguous to a rear end thereof and bent in a direction to which the shutter 22 is closed. Likewise, the second guide groove 40 has an end extension 40a which is contiguous to a rear end of the second guide groove 40 and extends substantially parallel to the direction of insertion and removal of the disk cartridge 20 relative to the cartridge holder 35.

An actuating pin 41 is mounted on the stepped front end of the lever 36 and disposed in the guide channel 35c of the cartridge holder 35. The actuating pin 41 is engageable with a front guide wall 33 (FIG. 6(a)) of the disk cartridge 20 and a front corner (FIG. 6(a)) of the shutter 22. A torsion spring 42 is fitted around a boss 36a for urging the lever 36 to turn about the boss 36a in the direction indicated by the arrow R1. The boss 36a projects from the underside of the lever 36 and is aligned with the first pin 37. The torsion spring 42 is disposed in the guide channel 35a of the cartridge holder 35 and has one end retained by a opposite end of the torsion spring 42 being retained by a lug 43 projecting from the underside of the cartridge holder 35.

The operation of the shutter opening and closing device of the foregoing construction will be described below with reference to FIGS. 2 through 5.

Figure 2:
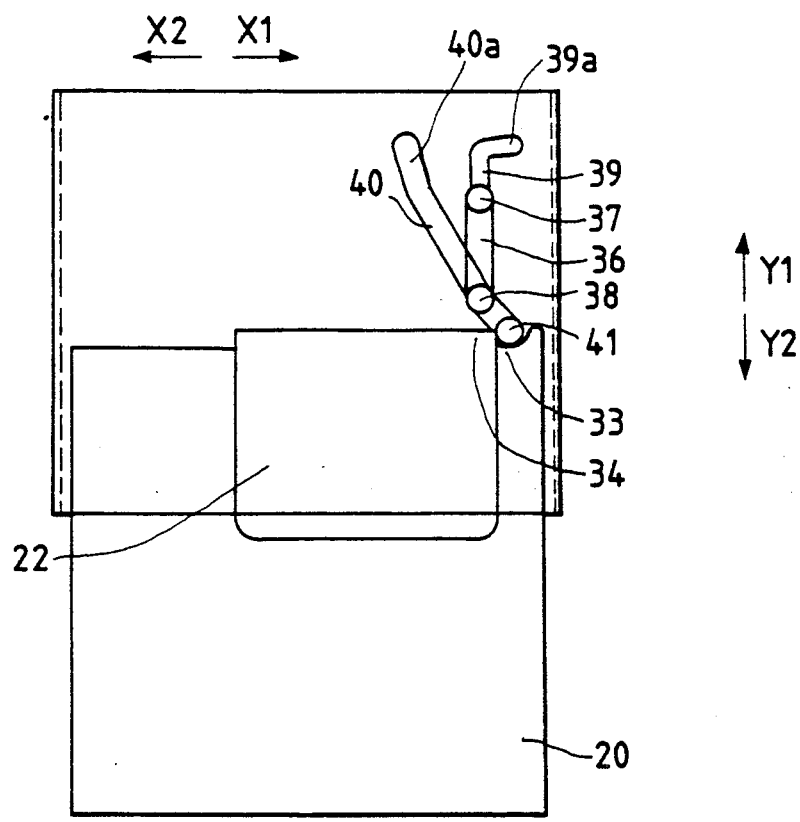
FIGS. 2 through 5 are schematic plan views illustrative of the manner in which the shutter opening and closing device operates.

When a disk cartridge 20 is inserted into the guide channel 35c of the cartridge holder 35 in the direction of the arrow Y1, a front guide wall 33 of the cartridge 20 and a front corner 34 of a shutter 22 of the disk cartridge 20 are brought into engagement with the actuating pin 41, as shown in FIG. 2.

Figure 3:
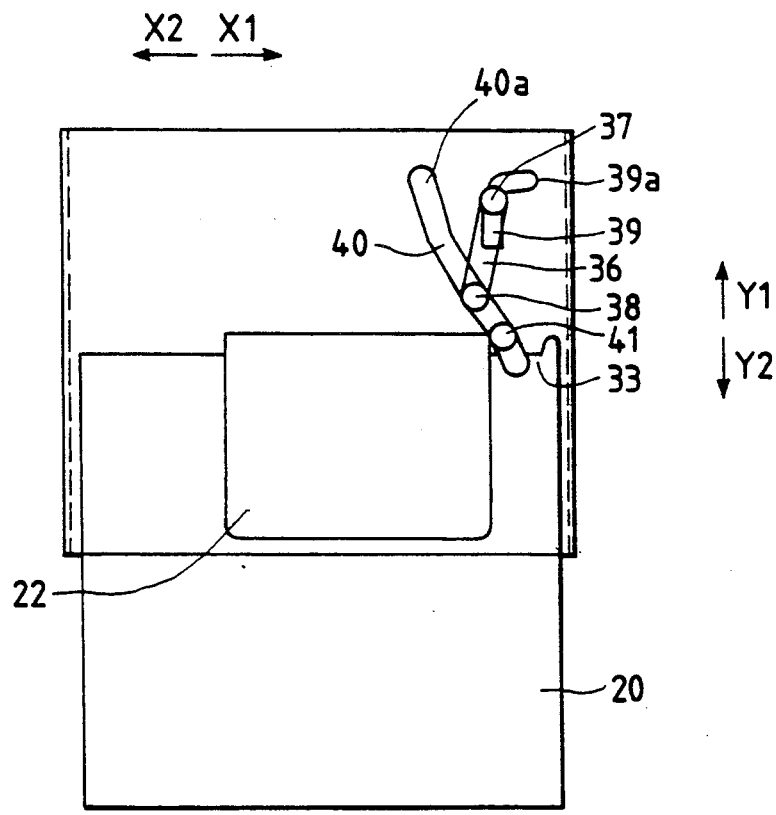
Figure 7:
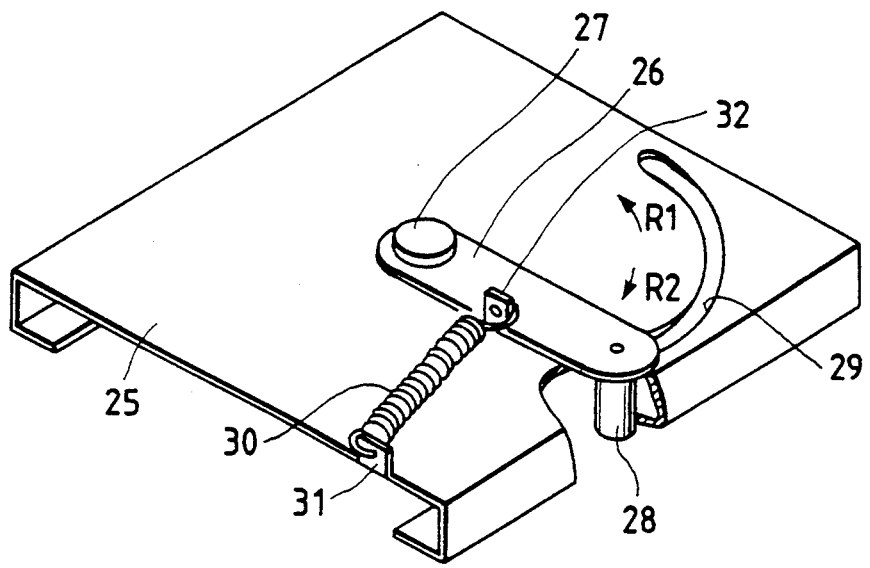
FIG. 7 is a schematic perspective view, with parts cutaway for clarity, of a conventional shutter opening and closing device.
Figure 10:
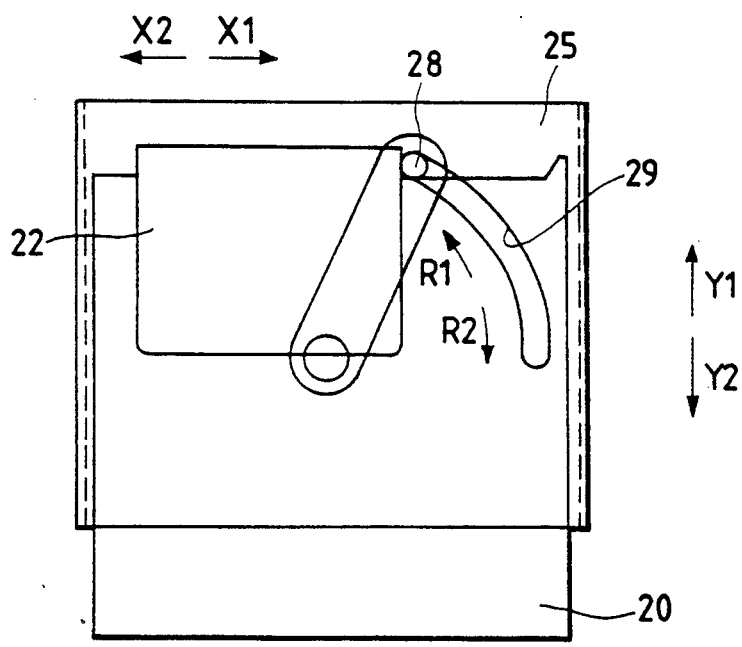
FIGS. 8 through 10 are schematic plan views illustrative of the manner in which the conventional shutter opening and closing device operates.
Figure 8:
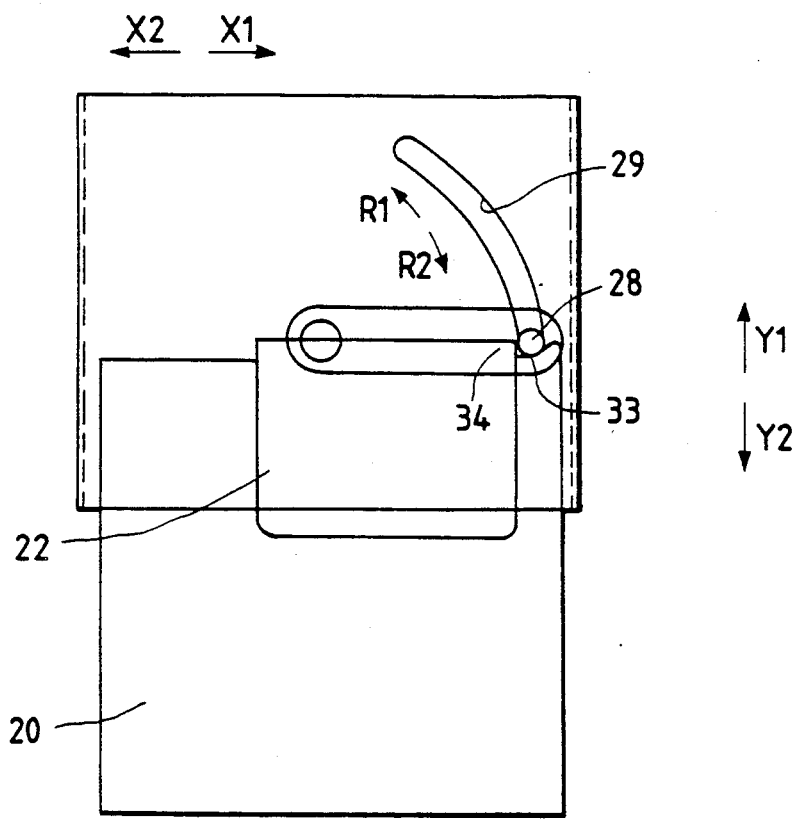
Figure 9:
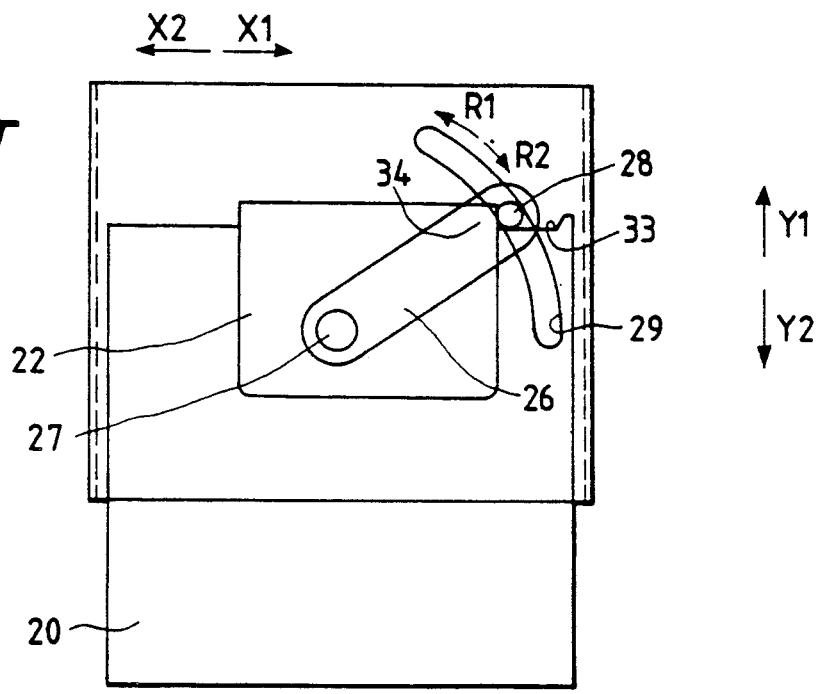

As the disk cartridge 20 is further advanced, the front guide wall 33 displaces the actuating pin 41 backwardly. The backward movement of the actuating pin 41 causes the second pin 38 to slide rearwardly along the oblique second guide groove 40 and simultaneously causes the first pin 37 to slide along the first guide groove 39 in the direction of the arrow Y1, as shown in FIG. 3. With this combined backward movement of the first and second pins 37, 38, the lever 36 gradually turns about the first pin 37 in the clockwise direction of FIG. 3 while continuously changing the position of its pivot axis, namely the first pin 37. During that time, the actuating pin 41 retracts along a straight path extending parallel to the oblique second guide groove 40. This linear retracting movement of the actuating pin 41 makes it possible to insert the disk cartridge 20 into the cartridge holder 35 with a smaller muscular effort as compared to the arcuate retracting movement of the actuating pin 28 of the conventional shutter opening and closing device shown in FIG. 7. The actuating pin 41 is held in engagement with the front corner 34 of the shutter 22 under the force of the spring 42 (FIG. 1), so that the linear retracting movement of the actuating pin 41 causes the shutter 22 to slide transversely in the direction of the arrow X2 against the force of the spring (not shown) disposed in the disk cartridge 20.

Figure 4:
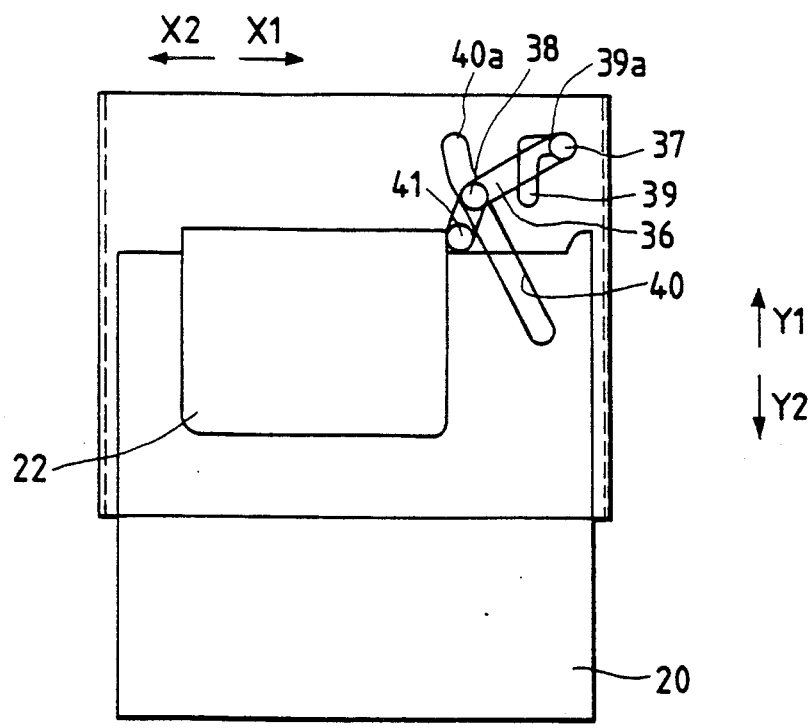

A further advancing movement of the disk cartridge 20 causes the first pin 37 to move into the end extension 39a of the first guide groove 39a, as shown in FIG. 4, whereupon the lever 36 turns clockwise about the first pin 37, thereby causing the second pin 38 to move into the end extension 40a of the second guide groove 40. During that time, the actuating pin 41 moves first along an arcuate path and subsequently along a straight path parallel to the direction of insertion of the disk cartridge 20.

Figure 5:
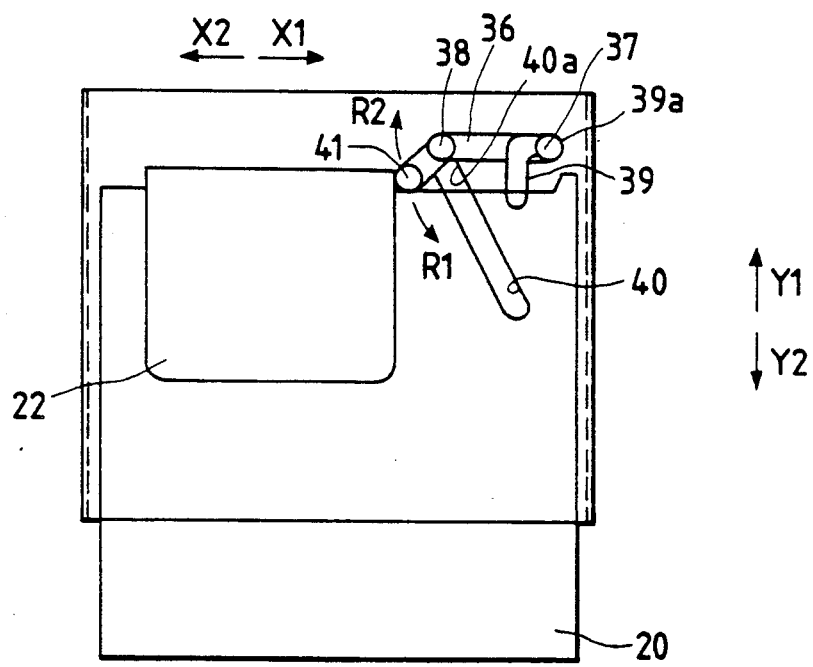
Figure 6B:
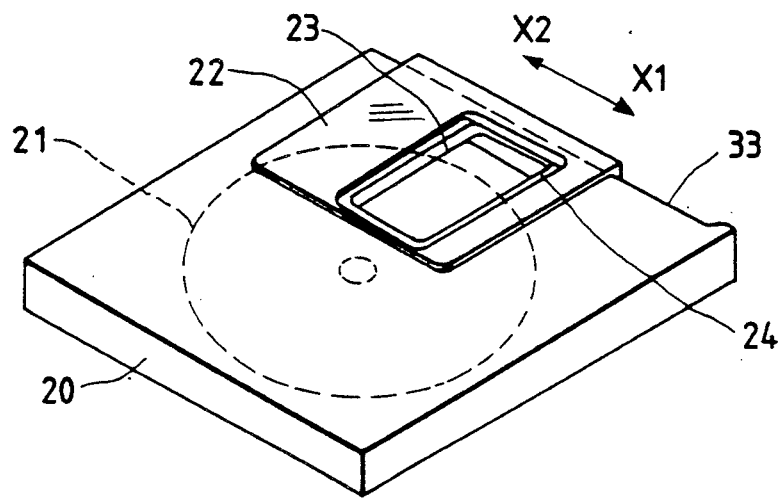
FIG. 6(b) is a view similar to FIG. 6(a), but showing the disk cartridge with the shutter in the open position.

When the disk cartridge 20 is fully inserted into the cartridge holder 35, as shown in FIG. 5, the actuating pin 41 displaces the shutter 22 to its leftmost open position. In this instance, the window 24 of the shutter 22 is disposed in registry with the head window 23 of the disk cartridge 21, so that a portion of the recording disk 21 is exposed through the superposed windows 23, 24, as shown in FIG. 6(b). Since the first and second pins 37, 38 are received in the end extensions 39a, 40a, the shutter 22 is stably held in its fully open position by means of the actuating pin 41.

In the course of the foregoing loading operation, if the forward movement of the disk cartridge 20 is discontinued, (i.e. when a forward pushing force or pressure on the disk cartridge 20 is released), the shutter 22 tends to move in the direction of the arrow X1 under the force of the non-illustrated spring. Simultaneously therewith, the spring 42 forces the lever 36 to turn counterclockwise about the first pin 37, thereby causing the actuating pin 41 to move forwardly in the direction of the arrow R1 (FIG. 4). Thus, the actuating pin 41 forces the front guide wall 33 of the disk cartridge 20 backward in the direction of the arrow Y2, thereby removing the disk cartridge 20 from the cartridge holder 35. During that time, the first and second pins 37, 38 return to their initial position shown in FIG. 2. The forward movement of the actuating pin 41 permits the shutter 22 to slide in the direction of the arrow X1 and return to its closed position of FIG. 6(a). The shutter 22 thus closes the head window 23 of the disk cartridge 20 to protect the recording disk 21 against damage which would otherwise be caused mainly by the dust.

As described above, since a substantial part of the shutter opening and closing device is disposed within the cartridge holder, the shutter opening and closing device is low in profile and compact in size and, therefore, makes it possible to reduce the overall size of a disk drive unit in which the shutter opening and closing device is incorporated. Furthermore, the actuating pin which engages the shutter and the disk cartridge moves substantially along a straight path so that the disk cartridge can be inserted smoothly with a small muscular effort. When the disk cartridge is fully inserted into the cartridge holder, the first and second pins are received in end extensions of the corresponding guide grooves. The end extensions are angled to main portions of the respective guide grooves, so that the shutter can be stably held in its fully opened position by means of the actuating pin.

Obviously, various minor changes and modifications of the present invention are possible in the light of the above teaching. It is therefore to be understood that within the scope of the appended claims the invention may be practiced otherwise than as specifically described.

What is claimed is:

1. A device for opening and closing a slidable shutter of a disk cartridge containing a recording disk, comprising:

a cartridge holder defining a guide channel receptive of the disk cartridge, said cartridge holder having a first guide groove extending in a first direction substantially parallel to the direction of insertion and removal of the disk cartridge relative to said guide channel of said cartridge holder, and a second guide groove extending obliquely to said first direction and inclined toward a second direction to which the shutter is opened;

a lever disposed in said guide channel of said cartridge holder and having first and second guide pins fitted in, and slidable along said first and second guide grooves, respectively, said lever being pivotally movable about said first pin and during pivotal movement of said lever, said first pin continuously changing its position along said first guide groove;

an actuating pin disposed on said lever and engageable with the shutter to open and close the shutter; and a spring disposed in said guide channel for urging said lever in a direction to close said shutter.

2. A device according to claim 1, wherein said first guide groove includes an end extension extending contiguously from a rear end of said first guide groove in a third direction to which the shutter is closed, said second guide groove including an end extension contiguous to a rear end of said second guide groove and extending in said first direction, said second pin being receivable in said end extension of said second guide groove for enabling said actuating pin to hold the shutter in its open position when said first pin is received in said end extension of said first guide groove.

3. A device according to claim 1, wherein said cartridge holder has an upper wall defining a part of said guide channel, each of said first and second pins having a flat enlarged head disposed on an outside surface of said upper wall, said lever being movably suspended from said upper wall of said cartridge holder by means of said headed first and second pins.

* * * * *